(12) United States Patent
Parrenin

(10) Patent No.: US 10,300,614 B2
(45) Date of Patent: May 28, 2019

(54) DEVICE FOR POSITIONING GLOVE PORTS ON A GLOVEBOX-TYPE CHAMBER

(71) Applicant: COMMISSARIAT A L'ENERGIE ATOMIQUE ET AUX ENERGIES ALTERNATIVES, Paris (FR)

(72) Inventor: Cedric Parrenin, Til-Chatel (FR)

(73) Assignee: COMMISSARIAT A L'ENERGIE ATOMIQUE ET AUX ENERGIES ALTERNATIVES, Paris (FR)

( * ) Notice: Subject to any disclaimer, the term of this patent is extended or adjusted under 35 U.S.C. 154(b) by 174 days.

(21) Appl. No.: 15/322,180

(22) PCT Filed: Jul. 1, 2015

(86) PCT No.: PCT/EP2015/064992
§ 371 (c)(1),
(2) Date: Dec. 27, 2016

(87) PCT Pub. No.: WO2016/001309
PCT Pub. Date: Jan. 7, 2016

(65) Prior Publication Data
US 2018/0147736 A1 May 31, 2018

(30) Foreign Application Priority Data

Jul. 3, 2014 (FR) ...................... 14 56391

(51) Int. Cl.
*G01B 3/30* (2006.01)
*B25J 21/02* (2006.01)
*G21F 7/053* (2006.01)

(52) U.S. Cl.
CPC ............... *B25J 21/02* (2013.01); *G01B 3/30* (2013.01); *G21F 7/053* (2013.01)

(58) Field of Classification Search
CPC .. B25J 21/02; G21F 7/04; G21F 7/053; G01B 3/30
(Continued)

(56) References Cited

U.S. PATENT DOCUMENTS 2,211,634 A * 8/1940 Baker .................... B23B 47/28
408/115 R
2,949,798 A * 8/1960 Berta, Jr. ............. E04F 21/003
33/563

(Continued)

FOREIGN PATENT DOCUMENTS

DE 10 2007 021 169 A1 11/2008
JP 2011-149705 A 8/2011

OTHER PUBLICATIONS

International Search Report dated Sep. 18, 2015 in PCT/EP2015/064992 filed Jul. 1, 2015.
(Continued)

*Primary Examiner* — Yaritza Guadalupe
(74) *Attorney, Agent, or Firm* — Oblon, McClelland, Maier & Neustadt, L.L.P.

(57) ABSTRACT

A device is for identifying glove-port positions to be mounted on a panel supported by a glovebox structure which defines a closed chamber enabling an operator to perform handling operations while being isolated from the chamber. The device includes a base, structure for attaching this base to the glovebox structure, and at least one template supported by this base while being movable with respect to this base, in order to be able to occupy different positions with respect to this base. Each template includes an opening which can receive a glove port. The device also includes structure for locking each template in position with respect to the base.

10 Claims, 2 Drawing Sheets

(58) Field of Classification Search
USPC .......................................................... 33/562
See application file for complete search history.

(56) References Cited

U.S. PATENT DOCUMENTS

| | | | | | |
|---|---|---|---|---|---|
| 3,583,823 | A | * | 6/1971 | Eaton ...................... | B23B 49/02 33/667 |
| 4,257,166 | A | * | 3/1981 | Barker .................. | B23B 47/287 33/667 |
| 4,538,354 | A | * | 9/1985 | Smolik .................. | B23B 47/28 33/563 |
| 4,813,826 | A | * | 3/1989 | Riedel ....................... | B27F 5/12 33/197 |
| 5,038,651 | A | * | 8/1991 | Burdick ............... | B23Q 9/0021 33/27.12 |
| 5,083,380 | A | * | 1/1992 | Robertson ................ | G01B 3/04 33/464 |
| 6,034,491 | A | * | 3/2000 | Layton .................. | B23Q 17/20 29/281.1 |
| 6,530,186 | B2 | * | 3/2003 | Torstensen ............ | E04F 21/003 248/354.1 |
| 7,020,975 | B2 | * | 4/2006 | Ernst ........................ | G09F 7/02 33/562 |
| 7,766,059 | B2 | * | 8/2010 | Kozina ..................... | B27F 5/12 144/144.51 |
| 2018/0147736 | A1 | * | 5/2018 | Parrenin .................. | B25J 21/02 |

OTHER PUBLICATIONS

French Search Report dated Apr. 23, 2015 in French Application 1456391 filed Jul. 3, 2014.

\* cited by examiner

DEVICE FOR POSITIONING GLOVE PORTS ON A GLOVEBOX-TYPE CHAMBER

TECHNICAL FIELD

The invention relates to the manufacture of a glovebox-type chamber, as schematically represented in FIG. 1, used in particular for radioactive substance handling. Such a box 1 comprises a structure or frame 2 carrying transparent panels 3 provided with openings receiving glove ports 4 in which gloves are mounted. The invention relates to the localisation of the positions of the glove ports 4 to make the openings at the proper locations in the panels of such a glove box.

STATE OF PRIOR ART

In practice, the position of the glove ports on a panel conditions the accessibility to the inner space of the chamber.

One solution consists in approximately assessing the positions of these openings before making them, hoping that they will enable the operator to access the entire inner volume of the chamber. Since the shapes of the glovebox change from box to box, this solution can result in placing the glove ports into positions not enabling the manipulator to access the entire inner volume when his/her arms are engaged in the glove ports.

Consequently, it is necessary to manufacture again the panel with better defined locations, which is disadvantageous considering the high cost of such panels, which are made of lead-loaded Plexiglas and the supply delay of which is generally long.

Another solution consists in making a prototyping to attach to the structure itself free of panels the glove ports at the locations foreseen, and checking that these locations enable the entire inner space to be accessed. The prototype can then be modified to correct the locations up to enable the operator to access the entire inner space with his/her arms engaged in the glove ports.

In practice, the prototyping is made with angle beams or other profiles, such that it is boring and complex to implement. This complexity is further increased when the goal is to place several glove ports on the prototyping.

DISCLOSURE OF THE INVENTION

The invention relates to a device for identifying a position of at least one glove port intended to equip a panel carried by a glovebox structure delimiting a closed chamber, this device comprising a base, means for attaching this base to the glovebox structure, at least one template comprising an opening able to receive a glove port, each template being carried by the base while being movable with respect to this base, and means for locking each template in position with respect to the base.

The invention thus makes it possible to very significantly reduce the time required to determine the positions of the glove ports. When the panel in question is withdrawn, the device is attached to the structure, at the location of this panel: the operator can pass his/her hands through the glove ports in order to determine whether the positions of these glove ports are adapted or not. If necessary, the operator unlocks the elements to replace one or more glove ports as he/she wants before locking them into their new position in order to make a new test. By trial and error, the operator thus succeeds in identifying the optimum configuration.

The invention also relates to a device thus defined, comprising a main post carrying a base, this main post being provided at the ends thereof with means for attaching to two cross members of the glovebox structure intended to receive the panel.

The invention also relates to a device thus defined, wherein the base is slidably mounted on this main post, and comprising means for locking the base with respect to the main post.

The invention also relates to a device thus defined, wherein each template is carried by the base while being movable with respect to this base perpendicularly to the main post, and comprising means for locking each template with respect to the base.

The invention also relates to a device thus defined, comprising a system of graduation marks along the main post and on each means for attaching the template to a base, to locate the position of each template by visual reading.

DETAILED DISCLOSURE OF PARTICULAR EMBODIMENTS

The idea underlying the invention is a device carrying one or more glove ports the positions of which are adjustable, which device is intended to be mounted on a glovebox structure free of panel. An operator can thus make tests enabling him/her to determine simply the positions of the glove ports which are best adapted to the task that has to be made in the box, and best adapted to access the entire inner space of the chamber.

Figure 1:
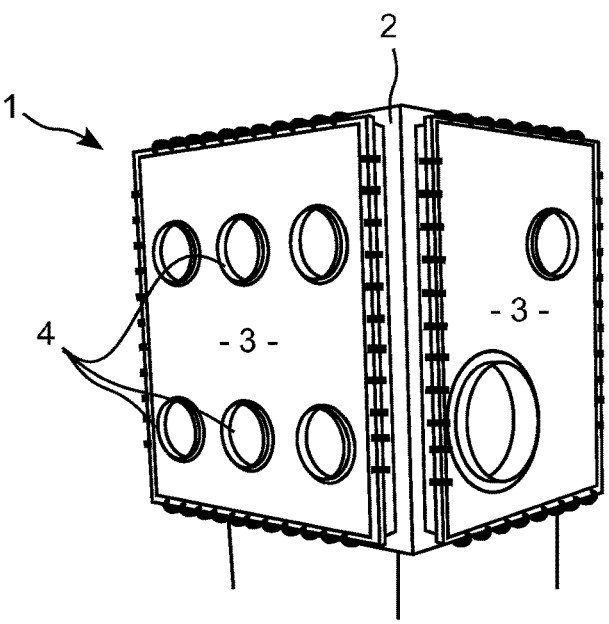
FIG. 1, already described, is an overview of a glovebox.
Figure 2:
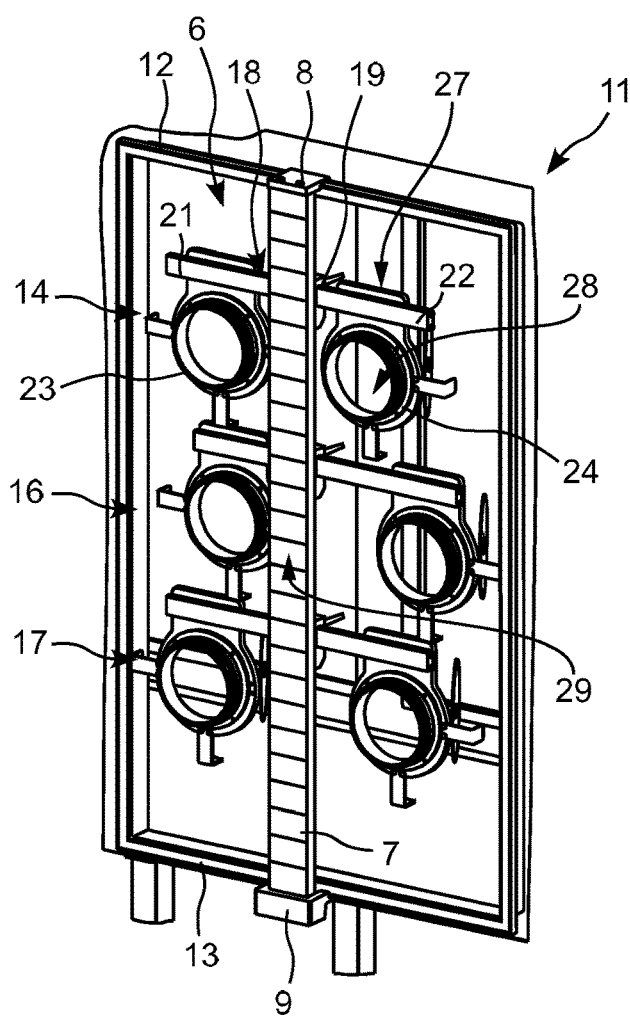
FIG. 2 is a perspective view of the device according to the invention in place on a glovebox structure.

The device which is schematically represented in FIG. 2, wherein it is marked as 6, includes a main post 7 in the form of a slider forming profile equipped at one end thereof with a fixed latching tab 8 and at the other end thereof with an adjustable latching tab 9. The fixed tab 8 is rigidly integral with the end of the post 7 whereas the adjustable tab 9 is able to slide along this post.

In use, the main post 7 extends vertically by having its fixed tab 8 latched to an upper horizontal cross member 12 of the glovebox structure 11, and its movable tab latched to a lower horizontal cross member 13 of the structure of this box 11. These cross members 12 and 13 correspond to the upper and lower edges of an opening of the structure intended to receive a panel when the box is completed.

This main post 7 carries several identical assemblies 14, 16, 17 each including two opening templates each able to receive a glove port and possibly a glove.

As can be seen in FIG. 2, the assembly 14 includes a slider forming cross member 18 which projects on either side from the post 7 by extending perpendicularly to the same, that is horizontally in position of use.

This slider forming cross member 18 is carried by a lockable fastener 19 which is slidably mounted on the slider forming post 7 and which is lockable in position on this post 7, to adjust vertically the position of the assembly 14 at any desired height.

The slider forming cross member 18 is itself transversally movable in the fastener 19 and lockable in position in the same, which enables the position of this cross member 18 to be transversally adjusted by offsetting more or less to left or right with respect to the post 7.

The cross member 18 thus includes a first portion 21 projecting from a side of the post 7 and a second portion 22 projecting from the other side of the post 7. The first portion 21 carries a first template 23 and the second portion carries a second template 24. Each template 23, 24 is slidably mounted on the slider forming cross member 18 and it can be locked at a given position along this cross member.

As can be seen in FIG. 2, the template 23 includes a plate 27 comprising an upper region equipped with means for nesting and locking in the slider forming cross member 18, and a lower region including an opening 28 on which a glove port is mounted. The template 24 is identical to the template 23.

The template 23 and the template 24 are thus adjustable in position on the cross member 18 and lockable in position along this cross member.

The fastener 19 includes a base having a part which engages in the post 7 and which is equipped with a locking screw enabling it to be immobilised along the post 7 by tightening this screw, and another part in which the cross member 18 is engaged with another locking screw to lock this cross member in position.

Analogously, the top part of each template is equipped with a base engaging in or about the cross member 18 to slide along the same and it is provided with a tightening screw enabling the template to be locked in position along this cross member 18.

Thus, both templates 23 and 24 are located at a same height which is adjustable by virtue of the movable fastener 19, and the side positions of both these templates are adjustable by moving sideways the cross member 18 with respect to the base of the lockable fastener 19 which carries it, and/or by moving sideways each template with respect to this cross member and by tightening the different locking screws to fix the transverse position of these templates.

In the configuration of FIG. 2, the assembly 14 is located at the top part of the post 7, and the other two assemblies, namely the assemblies 16 and 17 which are identical to the assembly 14 are located below the assembly 14 along the post 7.

In use, the operator starts with placing the post 7 by suspending it to the upper cross member 12 by means of the fixed fastener 8, and by attaching its lower region to the lower cross member 13 by means of the movable fastener 9.

Once the device is thus placed, the operator adjusts the height of each assembly 14, 16 and 17 along the post 7, and he/she tightens the corresponding locking screws. The operator can then adjusts sideways the positions of each of both templates of each assembly before tightening the corresponding locking screws.

Figure 3:
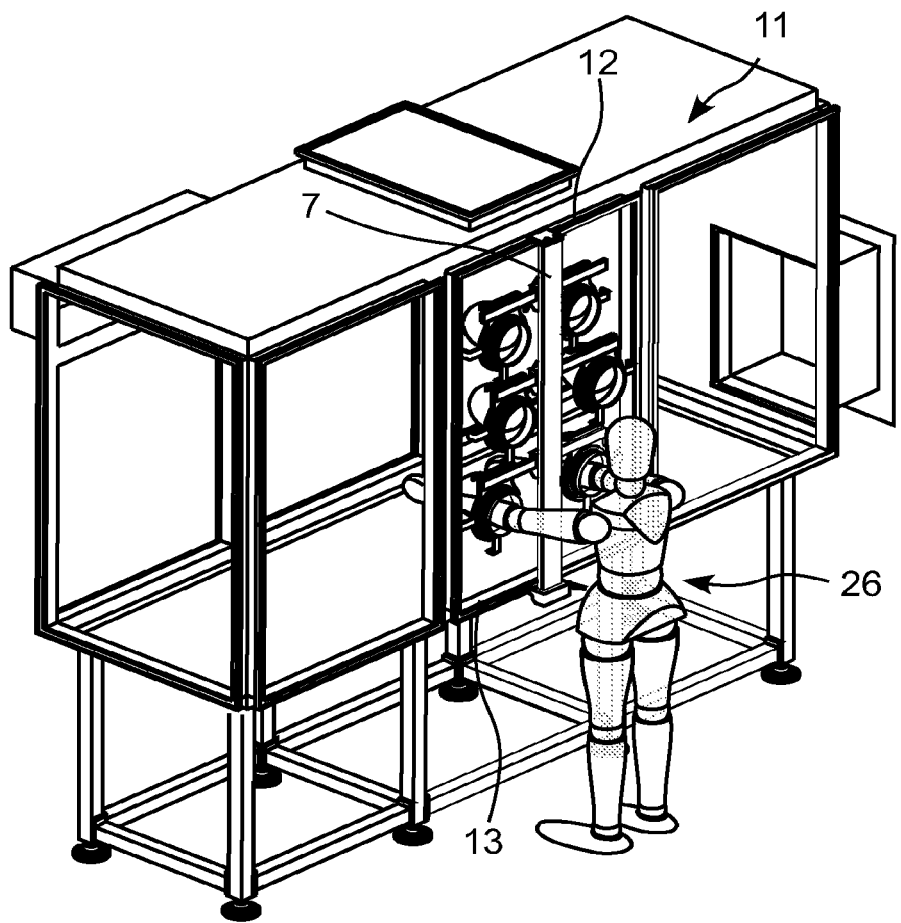
FIG. 3 is a perspective overview of a glovebox structure equipped with the device according to the invention with an operator making a simulation.

When this prepositioning has been made, the operator which is marked as 26 on FIG. 3 can make tests. At this time, he/she passes his/her arms in the different glove ports to check that he/she can access the different inner regions of the box, and he/she can make feeling minimum disturbance the task that has to be made in this box. Optionally, the operator readjusts the positions of each glove port of the device until optimum position settings are achieved.

When the operator considers that the glove ports carried by the templates are immobilized at the optimum positions, he/she can note down these positions after he/she has measured them. These measurements can be manually made with a tape measure, or simply by reading the graduation marks 29 intended to that end on the main post 7 and on the cross members enabling the position of each glove port to be identified. Another possibility can consist in using a laser measuring system for identifying the positions of each glove port.

The position data thus collected are then transferred on the panel that has to be placed in the box opening delimited by the cross members 12 and 13, before passing to the operation of cutting these openings in the panel.

The invention thus enables the position of each glove port to be accurately determined by making real tests for the ergonomics of handlings to be made. By the way, it is possible to equip each glove port with a glove to make the tests still more realistic. The invention further enables the positions identified to be accurately measured.

The invention which has been set forth within the context of radioactive substance handling is also applicable to other fields such as for example chemistry, biology and bacteriology. It can also be applied to the hospital environment for the case of incubators, and of works on viruses. The invention is further applicable to the field of quick-assembly movable chambers on theatres of civil or military operations.

The invention claimed is:

1. A device for identifying a position of at least one glove port intended to equip a panel carried by a glovebox structure delimiting a closed chamber, the device comprising:
    a lockable fastener including a base,
    means for attaching the base to the glovebox structure,
    at least one template comprising an opening configured to receive a glove port, each template being carried by the base while being movable with respect to the base, and
    means for locking each template in position with respect to the base.

2. The device according to claim 1, comprising a main post carrying the base, the main post being provided at the ends thereof with the means for attaching to two cross members of the glovebox structure intended to receive the panel, wherein the means for attaching include a fixed latching tab that is fixedly attached to an end of the main post and an adjustable latching tab that slides along the main post.

3. The device according to claim 2, wherein the base is slidably mounted on the main post, and comprising means for locking the base with respect to the main post.

4. The device according to claim 3, wherein each template is carried by the base while being movable with respect to the base perpendicularly to the main post, and comprising means for locking each template with respect to the base.

5. The device according to claim 4, comprising a system of graduation marks along the main post and on each means for attaching the template to a base, to locate the position of each template by visual reading.

6. The device according to claim 2, further comprising a cross member slidably attached to, and extending perpendicularly from the main post, wherein each template includes a plate slidably attached to the cross member at an upper portion of the plate and the opening is positioned on the plate below where the plate is slidably attached to the cross member.

7. The device according to claim 6, wherein the fixed latching tab is positioned on the main post above the cross member and the adjustable latching tab is positioned on the main post below the cross member.

8. A device for identifying a position of at least one glove port to equip a panel carried by a glovebox structure delimiting a closed chamber, the device comprising:
    a main post, a lockable fastener including a base slidably mounted on the main post, a fixed latching tab and an adjustable latching tab configured to attach the main post to the glovebox structure, the fixed latching tab being fixedly attached to an end of the main post and an adjustable latching tab that slides along the main post, at least one template comprising an opening configured to receive a glove port, each template being carried by the base while being movable with respect to the base, and a lock configured to lock each template in position with respect to the base.

9. The device according to claim 8, further comprising a cross member slidably attached to, and extending perpendicularly from the main post, wherein each template includes a plate slidably attached to the cross member at an upper portion of the plate and the opening is positioned on the plate below where the plate is slidably attached to the cross member.

10. The device according to claim 9, wherein the fixed latching tab is positioned on the main post above the cross member and the adjustable latching tab is positioned on the main post below the cross member.

\* \* \* \* \*